United States Patent [19]

Nakamachi et al.

[11] 4,048,101
[45] Sept. 13, 1977

[54] PROCESS FOR PREPARING A FOAMED BODY HAVING AN ANNULAR RING PATTERN IN CROSS-SECTION

[75] Inventors: Akio Nakamachi; Zenichi Maruo, both of Sakai, Japan

[73] Assignee: Daicel Ltd., Osaka, Japan

[21] Appl. No.: 643,138

[22] Filed: Dec. 22, 1975

[30] Foreign Application Priority Data

Dec. 27, 1974  Japan .................................. 50-3632

[51] Int. Cl.² .............................................. C08J 9/20
[52] U.S. Cl. ............................... 260/2.5 E; 260/2.5 B; 260/2.5 HB; 260/42.43; 260/42.48; 260/42.56; 260/874; 260/887; 260/892; 264/75
[58] Field of Search ........................... 260/2.5 B, 2.5 E

[56] References Cited

U.S. PATENT DOCUMENTS 2,744,291  5/1956  Stastny .............................. 260/2.5 B
3,474,048  10/1969  Chappelear et al. ............. 260/2.5 E

FOREIGN PATENT DOCUMENTS 853,321  11/1960  United Kingdom .............. 260/7.5 E

OTHER PUBLICATIONS

"Foaming Agents for Polyolefins", by Lasman, SPE Journal, Sept. 1962, pp. 1184-1193.

Primary Examiner—Morton Foelak
Attorney, Agent, or Firm—Blanchard, Flynn, Thiel, Boutell & Tanis

[57] ABSTRACT

A foamed body having an annular ring pattern in cross-section is prepared by blending a powdery or particulate styrene resin A and a powdery or particulate styrene resin B and molding the blend by extrusion or injection molding. The resin A particles have foaming components incorporated on the surfaces thereof, prior to blending same with resin B. The resin B has a lower fluidity than that of resin A by a difference of melt index of 1 to 20, it has a particle size larger than that of the resin A powder or particles, it is free of foaming component, it has a color different from that of powdery or particulate resin A, and it is compatible with resin A.

6 Claims, No Drawings

PROCESS FOR PREPARING A FOAMED BODY HAVING AN ANNULAR RING PATTERN IN CROSS-SECTION

BACKGROUND OF THE INVENTION

1. Field of the Invention

This invention relates to a process for preparing a foamed molding having, in cross-section, an annual ring pattern by mixing two different resins of the same chemical type, but which possess different physical properties.

2. Description of the Prior Art

Various attempts have been made to prepare synthetic resin moldings having in cross-section an annual ring pattern similar to natural woods, i.e., so-called synthetic woods. Preparation of non-foamed moldings having an annual ring pattern by extrusion or injection molding is relatively easy. However, when it is attempted to prepare foamed moldings having an annual ring pattern by extrusion or injection molding, the annual ring pattern becomes faint because of irregular reflection of pores of the foamed bodies and, therefore, it is difficult to obtain clear annular ring patterns only by combining differently-colored resin materials. This tendency toward faintness of color contrast is especially great when resins of the same chemical type are used. There have been known some processes that attempt to overcome this problem, for example, a process wherein resins of different chemical types (different recurring monomer units) are used and molding is effected in a screw extruder, taking advantage of the incomplete mixing of the resins that occurs due to their incompatibility or the difference in their plasticizing temperatures; a process wherein a rotator is disposed in an extruding nozzle for stirring the material; and a process wherein the resins are melted separately in two extruders and then the annual ring pattern is formed in an extruding nozzle. Alternatively, various attempts have been made in the field of injection molding, for example, employing a plunger-type injector or a screw-type injector.

However, if resins of different chemical types are used, there are disadvantages in that the adhesive bonding strength between the resin layers is insufficient and, accordingly, the layers readily separate from each other; the annual ring pattern thereby obtained is not delicate and does not have such depth as natural wood; the apparatus required for the process is large in scale and is expensive; and complicated operations are required.

SUMMARY OF THE INVENTION

We have discovered an improved process for obtaining easily a foamed product having an annual ring pattern similar to that of natural wood and in which the possibility of separation of the layers from each other is avoided by using resins of the same chemical type.

The object of the present invention is to provide a process for preparing a foamed body by combining two resins of the same chemical type, which process is characterized in that styrene polymer resins of the same chemical type but different colors are used, taking advantage of the difference in their melting properties from each other; the particle size of the resin having the higher melt index (hereinafter referred to as resin A) is made smaller than that of the other resin having the lower melt index (hereinafter referred to as resin B); and resin A is blended with a foaming (or blowing) agent, a foaming assistant, a nucleus-foaming agent, a wetting agent, etc. but resin B is not blended with them; whereby an annual ring pattern is formed by the synergistic effect obtained by combining the two resins. Further, for obtaining a deep annual ring pattern very similar to that of natural wood, resins A and B are colored with pigments of different colors of the same hue. Powdery or particular resin B, per se, may be a mixture of resins of different colors.

The styrene polymer resins employed in the present invention include styrene homopolymer resins, styrene copolymer resins such as AS (acrylonitrile-styrene) resin and rubber-containing styrene resins such as ABS (acrylonitrile-butadienestyrene) resin. For example, there can be employed a combination of two or more ABS resins which differ from each other in their melt index by an amount of 1 to 20 and in their physical properties due to differences in rubber content and in their melting property depending on another component copolymerized therewith.

As another copolymerizable component to control the melt index of the ABS resin, there can be used $\alpha$-substituted styrene such as $\alpha$-methylstyrene, nucleus-substituted styrene such as vinyltoluene and o-chlorostyrene, vinyl monomers such as acrylic acid, methacrylic acid and methyl or ethyl esters thereof and conjugated diene compounds such as isoprene.

In carrying out the present invention, there can be used as resin B having a lower melt index, a mixture of two or more resins having the same melt index as each other and different colors or a mixture of two or more resins having melt indexes different from each other and different from the melt index of resin A by 1 to 20 and having different colors. It is preferred that the melt index of resin B is 3 to 13 units less than the melt index of resin A, and both resins A and B have a melt index in the range of 1 to 20.

Resin B has a lower melting property and a larger particle size as compared with those of resin A and, accordingly, resin B is not dissolved or dispersed completely in resin A even if they are kneaded together in a screw extruder or injector. Multi-colored, annual ring patterns can be thus obtained by extrusion molding under such a condition.

As for the particle size of the powdery or particulate resin A, particle sizes in the range of 10–150 mesh (Japanese Industrial Standard) are suitable in the case of pearl-form resin obtained by suspension polymerization or emulsion-suspension polymerization. However, granulated or pulverized resins having particle sizes within said range can also be used. As for the particle size of the powdery or particulate resin B, resin B is used generally in the form of pellets of, for example, a diameter of about 1–2 mm and a length of about 3 mm. In general the resin B particles have at least one dimension which is larger, by from 0.5 to 7 mm, than the largest dimension of the resin A particles. They are colored suitably depending on the variety of the synthetic wood that is desired to obtain. Resin B is used in an amount in the range of 5 to 70 parts by weight per 100 parts by weight of resin A, depending on the desired variety of synthetic wood to be produced. Particularly, if resin B is used in an amount in the range of 10–30 parts, per 100 parts of resin A, desirable foamed bodies having fine pores and annular ring patterns quite similar to natural woods can be obtained.

The procedure for the extrusion molding will now be described. As an optional first step, resin A is first blended with a wetting agent or plasticizer in an amount of from 0.1 to 2 parts by weight of said wetting agent, per 100 parts of resin A. This step is not always needed and it can be omitted, if desired. Then to 100 parts of resin A there is added from 0.1 to 5 parts, each, of a foaming (blowing) agent, a foaming assistant, an agent for forming pore nuclei and a dry colorant and the mixture is blended together. Finally, this mixture is blended with resin B which is in the form of colored pellets. Consequently, the foaming agent scarcely adheres to the surfaces of the particles of resin B. In the molding process, foamed bodies having uniform small pores principally in the resin A component can be obtained, because resin A has a smaller particle diameter. Even though some of the foaming agent may migrate toward resin B in a small amount during the melt extrusion or injection step, the degree of foaming is relatively small in the resin B part of the annual ring pattern in comparison with the degree of foaming in the resin A portion. This improves the effect of producing annual ring patterns having a good appearance.

According to the present invention, foamed bodies which are very similar in appearance to natural woods can be produced from resins of the same chemical type easily, on a commercial scale, by using a screw extruder or a screw-type injector for injection molding, under the usual extrusion or injection molding conditions, because of the synergistic effect obtained by (1) the difference in fluidity owing to the difference in melt dispersion state due to the differences in particle diameter and melt index, and (2) the difference in foaming conditions owing to the special blending method. The commercial value of the present invention is thus very high.

Thus, in the present invention, in the screw extruder or screw-type injector, a hot, viscous, more or less two phase (resin A phase and resin B phase), liquid containing a solid blowing agent blended mostly in the resin A phase is formed and is heated to a temperature at which the blowing agent is partially decomposed. The hot, viscous liquid then passes through an orifice into a lower pressure zone wherein expansion of the resin A phase takes place resulting in a cellular structure therein, whereas the resin B phase is less completely foamed, whereby to form a rigid molded product having an annular ring pattern.

Another advantage of the present invention is that, unlike the case wherein resins of different kinds are used, products having a delicate appearance quite similar to that of natural woods can be obtained and the strength thereof is high.

The volumetric expansion during foaming, that is, ratio of volume after foaming : volume before foaming, is about 1.1:1 to 3:1, preferably 1.1:1 to 1.5:1. If the volumetric expansion is larger, the melt dispersion of resin B and irregular reflection of pores of the foamed body becomes remarkable so as to make the annular ring pattern unclear. Foamed bodies of unique tints different from those of natural woods can also be obtained by selecting colorants for resins A and B and the amounts thereof. Particularly, if foamed bodies similar to natural ebony, red sandalwood, Japanese cypress or Japan cedar are desired, regarding the three attributes of color, resin B in the form of pellets is colored with a pigment, or the like, of the same hue as resin A, but having a lower lightness.

Excellent results are obtained if the difference in lightness of resin B in comparison with resin A is in the range of 2 to 4.

The foaming or blowing agent employed in this invention is an organic decomposable, solid, gas-releasing compound having a decomposition temperature of 150° to 200° C, for example, azo compounds such as azodicarbonamide and azobisisobutyronitrile, nitroso compounds such as dinitroso pentamethylenetetramine and hydrazides such as p-toluene sulfonyl hydrazide and so on. Azodicarbonamide is preferred in view of its freedom from toxicity effects, as allowed by FDA.

The foaming assistant employed in this invention is used to modify or control the decomposition temperature of the foaming agent. For instance, there can be used organic acids such as benzoic acid, oxalic acid and stearic acid, organic metallic salts such as calcium, magnesium, zinc, cadmium or lead stearate, metal oxides such as ZnO, CdO, CaO, MgO and PbO, urea and amines.

The nucleating agent employed in this invention is a finely divided inert inorganic substance, for example, carbonates such as calcium carbonate and magnesium carbonate, silicic acid and salts thereof such as kaolin, talc, diatomaceous earth and sulfates such as barytes and gypsum.

The wetting agent employed in this invention is a liquid plasticizer having a suitable viscosity, for example, dioctylphthalate, dibutylphthalate and epoxylated soy bean oil.

It will be understood that the blowing agents, foaming assistants, nucleating agents and wetting agents are conventional materials used in the extrusion and injection molding of styrene polymer foams and the invention does not pertain to any discovery concerning these classes of substances. The specific compounds named above are typical of the respective classes of substances and it will be understood that other conventional substances of those types can also be used.

The foamed product obtained by the process of the invention is suitable as a structural or engineering plastic having a density of from 20-55 pounds per cubic foot.

The present invention will be further described by reference to the following illustrative examples, wherein the term "parts" means parts by weight.

EXAMPLE 1

100 Parts of resin A, i.e. ABS resin (C'est Bien V-610; a product of Daicel Co., Ltd.) having a melt index of 15 and a particle diameter of 40–100 mesh (average: 60 mesh), were mixed with 0.5 parts of dioctyl phthalate (wetting agent) by stirring in a tumbler. Then, 1.0 part of azodicarbonamide (foaming agent), 1.0 part of calcium stearate (foaming assistant), 0.5 part of talc (nucleus-forming agent) and 0.5 part of a dry colorant (MAD-180960 RED: a product of Dainichi-Seika Co., Ltd.), were added to the mixture and the stirring was continued. 20 Parts of resin B, i.e. black pellets of ABS resin (C'est Bien V-410; a product of Daicel Co., Ltd.) having a melt index of 2 and an average particle diameter of 2.1 mm and a length of 3.3 mm, in which carbon black and Pelinon Orange colorants had been incorporated, were added thereto and the whole mixture was stirred to form a uniform mixture.

The thus-prepared resin was then extruded by using a 30 mm extruder (screw L/D=22.5, CR=3.2) at a cylinder average temperature of 170° C, a die temperature of 130° C and a screw rotation rate of 30 rotations/minute. There was thus obtained a foamed body having a specific gravity of 0.85, uniform fine pores and an appearance very similar to that of ebony, wherein resin B was partially mixed in resin A to form an annual ring pattern.

For comparison, extrusion molding was effected in the same manner as in Example 1, except that there was used resin A in the form of pellets of the same size as the pellets of resin B. Melt dispersion of resins A and B was remarkable. The resulting foamed body had an unclear annual ring pattern as a whole.

For an additional comparison, the same procedure as in Example 1 was repeated except that beads and pellets of resins having the same melt index were used as resins A and B, respectively. The resulting foamed body scarcely showed an annual ring pattern.

EXAMPLE 2

Extrusion molding was carried out in the same manner as in Example 1 except that 100 parts of ABS resin (C'est Bien V-200; a product of Daicel Co., Ltd.) having a melt index of 5 to 6 and a particle size of 40–100 mesh (average: 60 mesh) were used as resin A, and 10 parts of red pellets of ABS resin (C'est Bien V-410; a product of Daicel Co., having a melt index of 2 and an average particle diameter of 2.1 mm and a length of 3.3 mm were used as resin B. The foamed body thus obtained had a specific gravity of 0.91, uniform fine pores and an appearance very similar to that of red sandalwood.

EXAMPLE 3

To 100 parts of resin A, i.e. ABS resin (C'est Bien V-200; a product of Daicel Co., Ltd) having a melt index of 5 to 6 and a particle size of 40–100 mesh (average: 60 mesh), 0.75 part of orange dry color (O-NG; a product of Towa Kagaku Co.) and 0.25 part of yellow dry color (YD-7; a product of Towa Kagaku Co.) were added. The same wetting agent, foaming agent, foaming assistant and nucleus-foaming agent as in Example 1, in the same amounts, were added and were mixed therein. The mixture was added with resin B comprising 15 parts of deep brown pellets, 4 parts of red pellets and 2 parts of black pellets having an average particle diameter of 2 mm and a length of 3 mm and a melt index of 2 (all C'est Bien V-410; a product of Daicel Co., Ltd.). The mixture was subjected to extrusion molding in the same manner as in Example 1 by using the same extruder at an average cylinder temperature of 175° C, a die temperature of 125° C and a screw rotation rate of 30 rotations/minute. There was thus obtained a foamed body having a specific gravity of 0.80, fine pores and a multi-colored annual ring pattern, wherein resin B was partially mixed in resin A by fusion.

When an extruder of 50 mm (screw L/D=24) was used, a foamed body having a similar pattern was obtained.

EXAMPLE 4

100 Parts of resin A, i.e. ABS resin (C'est Bien V-610; a product of Daicel Co., Ltd.) having a melt index of 15 and a particle size of 40–100 mesh (average: 60 mesh) were mixed with 0.5 part of ivory dry color and the same wetting agent, foaming agent, foaming assistant and nucleus-forming agent as in Example 1 in the same amounts as in Example 1 and the whole was stirred to obtain a uniform mixture. To the mixture was then added resin B comprising 5 parts of color pellets of ABS resin (C'est Bien V-200; a product of Daicel Co, Ltd.) having a melt index of 5 to 6 and an average particle diameter of 2.1 mm and a length of 3.3 mm in which a gray colorant had been incorporated and 10 parts of color pellets of the same ABS resin in which a yellowish brown colorant had been incorporated. The whole was stirred to obtain a uniform mixture. The resin thus prepared was subjected to injection molding by using a molding machine (IS-630 A) of Toshiba Co. to obtain a molding in the form of a box of a thickness of 5 mm and a size of 300 × 300 × 320 mm.

Molding conditions were as shown below:

| | |
|---|---|
| Nozzle temperature: | 200° C |
| Cylinder temperature (head): | 200° C |
| Cylinder temperature (center): | 190° C |
| Cylinder temperature (tail): | 190° C |
| Die temperature (fixed): | 45° C |
| Die temperature (mov): | 45° C |
| Injection pressure: | 80 Kg/cm$^2$ |
| Injection time: | 18 sec. |
| Cooling time: | 105 sec. |
| Intermediate time: | 15 sec. |
| Feed: | 220 mm |
| Cushion: | 0 |
| Injection speed: | 2.4 m/sec. |
| Screw rotation: | 50 rpm |
| Screw back pressure: | 5 Kg/cm$^2$ |

A foamed body very similar to box-wood having a specific gravity of 0.8 was thus obtained.

In those examples of this invention, melt index was determined according to ASTM-D-1238, that is, the temperature of 230° C and the weight of 5 kg.

The embodiments of the invention in which an exclusive property or privilege is claimed are defined as follows:

1. A process for preparing a foamed molding having an annual ring pattern in cross-section, which comprises the steps of:
   I. dry blending particles of a first styrene resin A having a particle size in the range of from 10 to 150 mesh, with additives consisting essentially of
      1. from 0.1 to 5 parts by weight, per 100 parts by weight of said resin A, of an organic, heat-decomposable, solid, gas-releasing foaming agent having a decomposition temperature of from 150° to 120° C,
      2. from 0.1 to 5 parts by weight, per 100 parts by weight of said resin A, of a foaming assistant effective for controlling the decomposition temperature of said foaming agent,
      3. from 0.1 to 5 parts by weight, per 100 parts by weight of said resin A, of a finely divided, inert, inorganic substance effective for forming pore nuclei in said resin A during foaming thereof, and
      4. a dry colorant, for altering the normal color of said resin A,
      whereby to coat the particles of resin A with said additives;
   II. dry blending with the product of step I, a substance consisting essentially of colored pellets of a second styrene resin B colored within a colorant or colorants for altering the normal color of said resin B wherein said resin B has a melt index which is less than the melt index of said resin A by a value of from one to 20 melt index units and wherein said resin B pellets are free of said additives and have at least one dimension which is from 0.5 to 7 mm larger than the largest dimension of said resin A particles, the amount of said resin B pellets being from 5 to 70 parts by weight per 100 parts by weight of said resin A particles, said resin B pellets being colored with a color or colors different from that of said dry colorant for said resin A;

III. placing the product of step II in a molding machine and therein heating and mixing the product of step II by screw means to form a hot, viscous, molten, molding composition consisting essentially of a resin A phase and a resin B phase and in which said additives are present primarily in the resin A phase and said foaming agent is partially decomposed, and then passing the molding composition through an orifice into a zone of lower pressure wherein the molding composition expands to form a foamed molding, wherein the ratio of the volume of the molten molding composition prior to molding : the volume of the foamed molding is from 1:1.1 to 1:3, said foamed molding having in cross-section an annular ring pattern consisting essentially of layers of foamed resin A and substantially unfoamed resin B.

2. A process in claim 1 in which resin A and resin B are both acrylonitrile-butadiene-styrene resins.

3. A process as claimed in claim 1 in which the weight ratio of A : B is 100 : 10 to 30 parts by weight.

4. A process as claimed in claim 1 in which the melt index of resin B is 3 to 13 units less than the melt index of resin A, and both resins A and B have a melt index in the range of 1 to 20.

5. A process as claimed in claim 1, in which the pellets of resin B have a diameter of about 1 to 2 mm and a length of about 3 mm.

6. A process as claimed in claim 1, wherein the ratio of the volume of the molten molding composition prior to molding : the volume of the foamed molding is 1 : 1.1 to 1:1.5.

* * * * *